(12) United States Patent
Matsuyama

(10) Patent No.: US 6,602,432 B2
(45) Date of Patent: Aug. 5, 2003

(54) ELECTROABSORPTION MODULATOR, AND FABRICATING METHOD OF THE SAME

(75) Inventor: Takayuki Matsuyama, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 70 days.

(21) Appl. No.: 09/996,656

(22) Filed: Nov. 28, 2001

(65) Prior Publication Data

US 2002/0066718 A1 Jun. 6, 2002

(30) Foreign Application Priority Data

Dec. 4, 2000 (JP) ......................... 2000-368606

(51) Int. Cl.[7] .............. H01L 21/00; B44C 1/22
(52) U.S. Cl. .............. 216/24; 359/298; 359/315; 438/718; 438/737
(58) Field of Search ................. 438/718, 723, 438/735, 737, 743, 745; 216/24, 67, 79; 359/237, 298, 299, 315

(56) References Cited

U.S. PATENT DOCUMENTS 5,624,529 A * 4/1997 Shul et al. ............... 438/718

FOREIGN PATENT DOCUMENTS

| JP | 2040964 | * 7/1996 |
| JP | 10-073790 | * 3/1998 |

* cited by examiner

Primary Examiner—William A. Powell
(74) Attorney, Agent, or Firm—Hogan & Hartson, LLP

(57) ABSTRACT

A high-speed operation of an electroabsorption modulator is intended. A p-InGaAs contact layer 9 is formed not only in an optical modulation region MA but also in an optical coupling region CA, and an AlInAs oxide layer 7 is disposed in p-InP cladding layers 5 and 8 in a mesa MS portion of the optical coupling region CA.

8 Claims, 16 Drawing Sheets

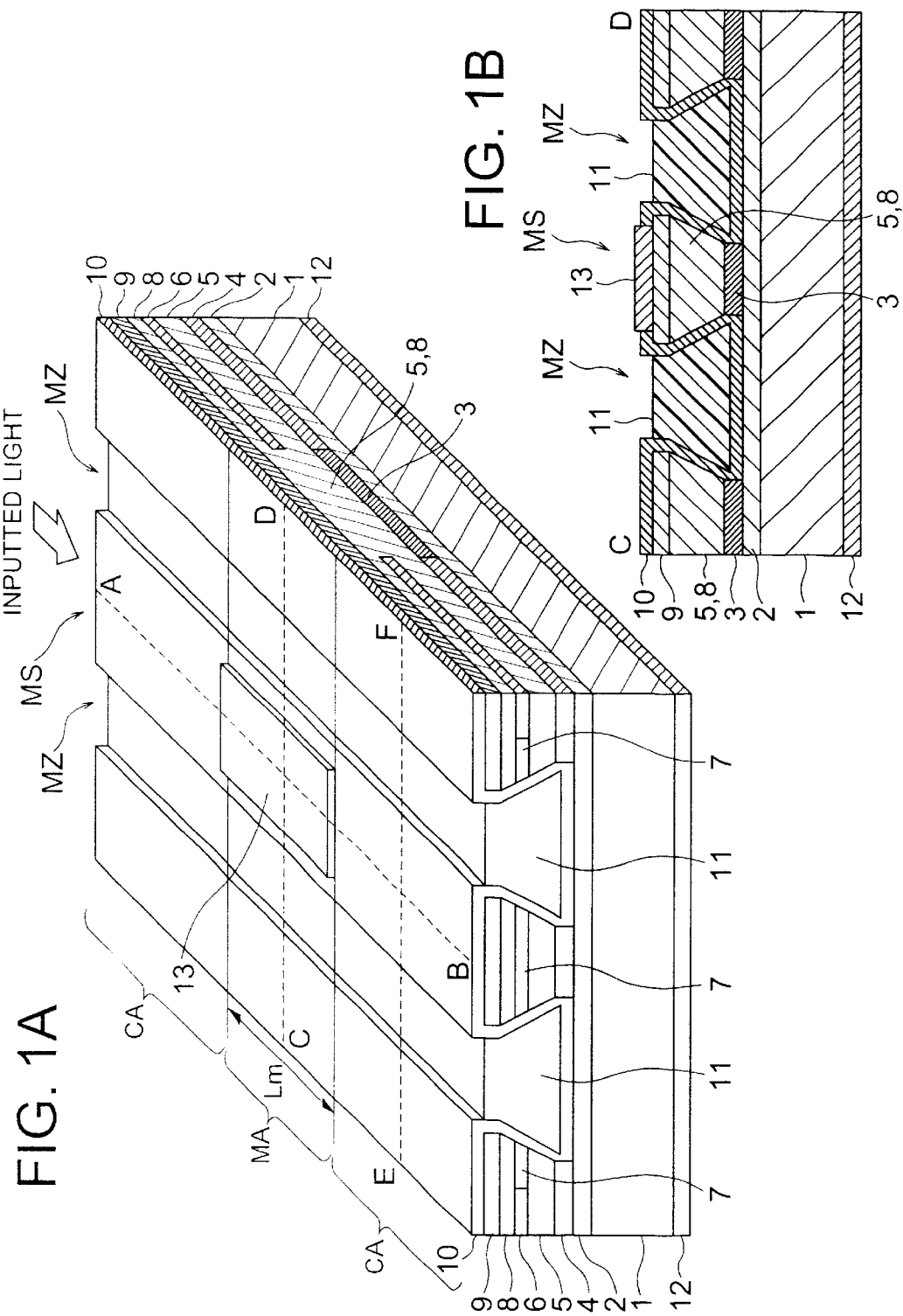

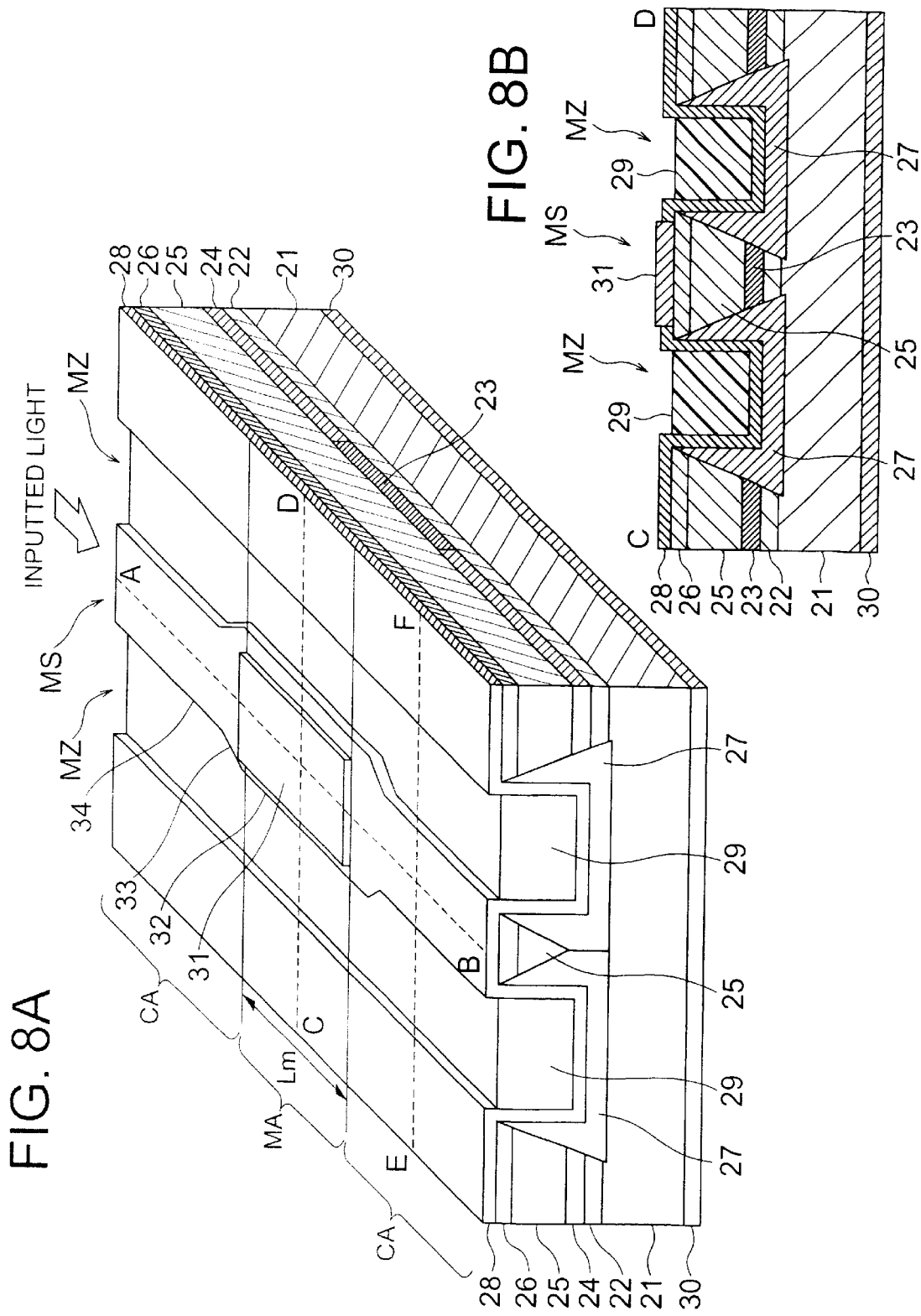

ELECTROABSORPTION MODULATOR, AND FABRICATING METHOD OF THE SAME

CROSSREFERENCE TO RELATED APPLICATION

This application is based upon and claims the benefit of priority from the prior Japanese Patent Application No. 2000-368606, filed on Dec. 4, 2000; the entire contents of which are incorporated herein by reference.

BACKGROUND

1. Field of the Invention

The present invention relates to an electroabsorption modulator and a fabricating method thereof, in particular to an electroabsorption modulator appropriate for use in high speed modulation, 40 GHz or more, of laser light from a semiconductor laser, and a fabricating method thereof.

2. Description of the Related Art

Recently, as information communication demand in the Internet or the like increases, technology for high speed transmission of a larger volume of information to a distant place, not to mention to a trunk line, but also to a branch line, is demanded. As such technology, there is a large-capacity optical communication system.

In the large-capacity optical communication system, light emitted from a semiconductor laser is speedily modulated into digital signal; the modulated light is transmitted by means of the optical fiber; thereby high speed and distant transmission is realized. As an optical modulation method, it is general to directly modulate a semiconductor laser. However, the direct modulation of the semiconductor laser causes a relaxation oscillation in the semiconductor laser, thereby resulting in variation of wavelength due to chirping. When such light is transmitted through the optical fiber, there occurs a difference between the transfer times of the optical fiber, resulting in mode dispersion. As a result, communication distance is limited.

As a method for reducing the chirping at the direct modulation, there is a method in that light emitted from the semiconductor laser undergoes external modulation by means of an optical modulator. Among such optical modulators, an electroabsorption modulator (EA modulator) is in heavy usage. The electroabsorption modulator makes use of the quantum confinement Stark effect of a quantum well, and has advantages in that it may be mass-produced at relatively low costs, and may be driven at low voltages.

FIG. 13A is a perspective view showing a rough configuration of an existing electroabsorption modulator, and FIG. 13B is a sectional view obtained by cutting along a C-D line in FIG. 13A. In FIG. 13A, the electroabsorption modulator is provided with an optical modulation region MA of a length Lm and optical coupling regions CA, which are formed on both sides of the region MA; in the optical modulation region MA and the optical coupling regions CA, a mesa, which is formed in stripe in a light incident direction (A-B direction), and grooves MZ, which are formed on both sides of the mesa MS, are disposed. The length Lm of the optical modulation region MA may be set at, for instance, 100 μm.

In the optical modulation region MA, as shown in FIG. 13B, an n-InP cladding layer 62 is formed on an n-InP substrate 61; and in the mesa MS portion, an optical absorption layer 63, a p-InP cladding layer 64, and a p-InGaAs contact layer 65 are formed. The optical absorption layer 63 has a multiple quantum well (MQW) structure, and may be formed by combining 14 pairs of, for instance, an InGaAsP quantum well layer of 1.5 nm and an InGaAsP barrier layer of 1.3 nm.

Furthermore, a silicon oxide film 68 is formed in the mesa MS and the grooves MZ, and resin 69 is filled in the grooves MZ. An n-side electrode 70 is formed on a back-face of the n-InP substrate 61, and a p-side electrode 71 is formed on the mesa MS of the optical modulation region MA.

Meanwhile, in the optical coupling region CA, as shown in FIG. 13A, the n-InP cladding layer 62 is formed on the n-InP substrate 61, and, in the mesa MS portion, an InGaAsP guide layer 66 and an n-InP cladding layer 67 are formed. Furthermore, the silicon oxide film 68 is formed in the portions of the mesa MS and the grooves MZ, and the resin 69 is filled in the grooves MZ. A composition of the InGaAsP guide layer 66 may be set so that a wavelength of, for instance, 1.1 μm may be obtained.

Light inputted in the optical coupling region CA is transferred through the InGaAsP guide layer 66 to the optical modulation region MA. Upon the light being transferred to the optical modulation region MA, the Stark effect is generated in the optical absorption layer 63 based on a voltage applied to the p-side electrode 71, and an energy gap in the quantum well varies. When the energy gap varies, an optical absorption wavelength due to exciton varies, and transmittance of the laser light in the optical absorption layer 63 varies, thereby optical modulation is performed. The modulated light is emitted through the optical coupling region CA.

FIG. 14A through FIG. 16B are diagrams showing a sequence of fabricating an existing electroabsorption modulator. FIG. 14A, FIG. 14B, and FIG. 14D are sectional views obtained by cutting along an A-B line in FIG. 13A, FIG. 15B and FIG. 16A sectional views cut along a C-D line in FIG. 13A, and FIG. 15C and FIG. 16B sectional views cut along an E-F line in FIG. 13A.

In FIG. 14A, the n-InP cladding layer 62, the optical absorption layer 63, the p-InP cladding layer 64, and the p-InGaAs contact layer 65 are successively grown on the n-InP substrate 61, by means of MOCVD (metal-organic chemical vapor deposition).

Next, as shown in FIG. 14B and FIG. 14C, a silicon oxide film 72 of a width Lm is formed on the p-InGaAs contact layer 65, and etching, such as RIE, is performed with the silicon oxide film 72 as a mask, thereby the optical absorption layer 63, the p-InP cladding layer 64, and the p-InGaAs contact layer 65 in the optical coupling regions CA are removed.

Next, as shown in FIG. 14D, an InGaAsP guide layer 66 and an n-InP cladding layer 67 are selectively grown on the optical coupling regions CA, by performing deposition such as MOCVD with the silicon oxide film 72 as a mask. Then, a silicon oxide film 73 is deposited on an entire surface by means of CVD and so on. By depositing the InGaAsP guide layer 66 in the optical coupling region CA, the InGaAsP guide layer 66 and the optical absorption layer 63 may be allowed to optically couple.

Next, as shown in FIG. 15A, FIG. 15B, and FIG. 15C, the silicon oxide film 73 is patterned into stripes corresponding to the mesa MS and the grooves MZ. Then, by performing chemical etching with the patterned silicon oxide film 73 as a mask, the optical absorption layer 63, the p-InP cladding layer 64, and the p-InGaAs contact layer 65 in the grooves MZ of the optical modulation region MA are removed in mesa; and the InGaAsP guide layer 66 and the n-InP cladding layer 67 in the grooves MZ of the optical coupling region CA are removed in mesa. Thereby, the optical absorption layer 63 of the mesa MS is separated by the grooves MZ.

The length Lm of the optical modulation region MA may be set at, for instance, 100 $\mu$m; a width LS of the mesa MS at, for instance, 5 $\mu$m; and a width Lp of the optical absorption layer 63 at, for instance, 2 $\mu$m. Optical modulation is performed in the optical absorption layer 63 of the mesa MS corresponding to the stripe portion.

Next, as shown in FIG. 16A and FIG. 16B, after removing the silicon oxide film 73, the silicon oxide film 68 is deposited on an entire surface by means of CVD and so on, and the resin 69 is filled in the grooves MZ. Then, the p-side electrode 71 is formed on the mesa MS portion of the optical modulation region MA, and furthermore, a bonding pad 74 is formed. Thereafter, the n-InP substrate 61 is ground to substantially 100 $\mu$m, and the n-side electrode 70 is formed on a back-face of the n-InP substrate 61.

A cut-off frequency of the optical modulator depends on element capacitance and element resistance. In order to allow the optical modulator to operate at high-speeds, the element capacitance is designed to be as small as possible. The element capacitance mainly depends on parasitic capacitance of the bonding pad 74 and PN junction capacitance in the stripe portion of the optical modulation region MA. The parasitic capacitance of the bonding pad 74, though depending on relative permittivity of the resin 69 and a film thickness of the silicon oxide film 68, may be decreased to from 10 to 50 fF depending on design.

Meanwhile, the capacitance of the stripe portion of the optical modulation region MA is 150 fF per 100 $\mu$m, larger by substantially one figure than the parasitic capacitance of the bonding pad 74. Accordingly, in order to reduce the element capacitance of the optical modulator, it is effective to shorten the length Lm of the optical modulation region MA.

However, when the length Lm of the optical modulation region MA is made shorter, though the element capacitance of the optical modulator becomes smaller, an area of the p-InGaAs contact layer 65 also becomes smaller. As a result, when the element capacitance of the optical modulator is made smaller, the element resistance becomes larger, resulting in a problem in that the high-speed operation of the optical modulator becomes difficult.

The element resistance of the optical modulator, shown in FIG. 13A, is, for instance, substantially 20 $\Omega$, substantially threefold or more larger in comparison with that of the semiconductor laser that has an element length 300 $\mu$m. Accordingly, in the existing optical modulator, the cut-off frequency becomes substantially 28 GHz, resulting in difficulty in operating with high-speed of 40 GHz.

The object of the present invention is to provide an electroabsorption modulator capable of realizing a high-speed operation of the optical modulator, and a fabricating method thereof.

SUMMARY

An electroabsorption modulator according to an embodiment of the present invention includes a first conductivity type cladding layer formed on a first conductivity type substrate: an optical absorption layer formed on the first conductivity type cladding layer: a second conductivity type cladding layer formed on the optical absorption layer: a contact layer formed on the second conductivity type cladding layer: and a high-resistance layer partially formed in a region in an optical propagation direction of the second conductivity type cladding layer.

Furthermore, an electroabsorption modulator according to another embodiment of the present invention includes a first conductivity type cladding layer formed on a first conductivity type substrate: an optical absorption layer formed on the first conductivity type cladding layer: an optical waveguide layer, which is formed on the first conductivity type cladding layer so as to optically couple with the optical absorption layer, and has a stripe width larger than that of the optical absorption layer: a second conductivity type cladding layer formed on the optical absorption layer and the optical waveguide layer: a contact layer formed on the second conductivity type cladding layer: and a proton implanted layer obliquely formed on the second conductivity type cladding layer.

A fabricating method of an electroabsorption modulator according to an embodiment of the present invention includes forming a first conductivity type cladding layer on a first conductivity type substrate: forming an optical absorption layer on the first conductivity type cladding layer: forming an optical waveguide layer, which is optically coupled with the optical absorption layer, on the first conductivity type cladding layer: forming a second conductivity type cladding layer on the optical absorption layer and the optical waveguide layer: forming an oxidizable semiconductor layer in a region corresponding to on the optical waveguide layer in the second conductivity type cladding layer: forming a contact layer on the second conductivity type cladding layer: etching the contact layer, the second conductivity type cladding layer, the oxidizable semiconductor layer, the optical absorption layer and the optical waveguide layer in stripes: and oxidizing the oxidizable semiconductor layer from a sidewall of the stripe.

A fabricating method of an electroabsorption modulator according to another embodiment of the present invention includes forming a first conductivity type cladding layer on a first conductivity type substrate: forming an optical absorption layer on the first conductivity type cladding layer: forming an optical waveguide layer, which is optically coupled with the optical absorption layer, on the first conductivity type cladding layer: forming a second conductivity type cladding layer on the optical absorption layer and the optical waveguide layer: forming a contact layer on the second conductivity type cladding layer: etching the contact layer, the second conductivity type cladding layer, the optical absorption layer, and the optical waveguide layer in stripes, so as for a stripe width of the optical absorption layer to be larger than that of the optical waveguide layer: and implanting protons in an oblique direction from a sidewall of the stripe.

BRIEF DESCRIPTION OF THE DRAWINGS

The invention is described with reference to the drawings, which are presented for the purpose of illustration only and limit in no way the invention.

FIG. 1A is a perspective view showing a rough configuration of an electroabsorption modulator according to a first embodiment of the present invention, and FIG. 1B is a sectional view obtained by cutting along a C-D line in FIG. 1A.

FIG. 8A is a perspective view showing a rough configuration of an electroabsorption modulator according to a second embodiment of the present invention, and FIG. 8B is a sectional view obtained by cutting along a C-D line in FIG. 8A.

Figure 2A:
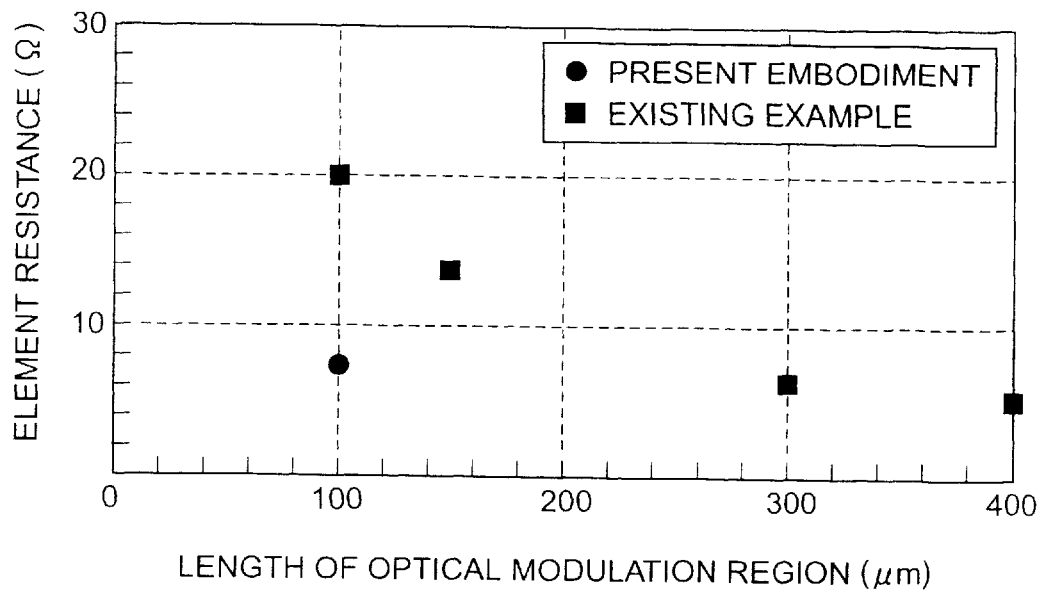
FIG. 2A is a diagram showing, in comparison with an existing example, relationship between length and element resistance of an optical modulation region of the electroabsorption modulator according to the first embodiment of the present invention.

DETAILED DESCRIPTION
(Explanation of Embodiments)

According to the present invention, contact resistance may be decreased without increasing element capacitance, as a result, a high-speed operation of an optical modulator may be realized.

That is, according to one embodiment, even when a length of the contact layer is made longer, since an electric field on an optical absorption layer may be shielded by a high resistance layer, element resistance may be decreased while suppressing an increase of the element capacitance. As a result, a high-speed operation of the optical modulator may be realized.

Furthermore, according to another embodiment, even when the contact layer is formed on the optical waveguide layer, since an electric field on the optical waveguide layer may be shielded by a proton implanted layer, the element resistance may be decreased while suppressing an increase of the element capacitance. As a result, a high-speed operation of the optical modulator may be realized.

Still furthermore, according to one embodiment, even when the contact layer is formed on the optical waveguide layer, since an electric field on the optical waveguide layer may be shielded by an oxide layer formed in the oxidizable semiconductor layer, the element resistance may be decreased while suppressing an increase of the element capacitance. As a result, a high-speed operation of the optical modulator may be realized.

Furthermore, according to still another embodiment, even when the contact layer is formed on the optical waveguide layer, since an electric field on the optical waveguide layer may be shielded by a proton implanted layer, the element resistance may be decreased while suppressing an increase of the element capacitance. As a result, a high-speed operation of the optical modulator may be realized.

Furthermore, as an implementation mode, the high resistance layer is a semiconductor oxide layer formed in the second conductivity type cladding layer. Thereby, the high resistance layer may be easily formed in a portion other than a modulation region. As a result, even when the modulation region is made shorter so as to make the element capacitance smaller, an increase of the element resistance may be suppressed.

Still furthermore, as an implementation mode, the high resistance layer is a proton implanted layer formed in the second conductivity type cladding layer. Thereby, by adding only a simple process, the high resistance layer may be easily formed in a portion other than a modulation region. As a result, even when the modulation region is made shorter so as to make the element capacitance smaller, an increase of the element resistance may be suppressed.

Furthermore, as an implementation mode, the proton implanted layer penetrates through on the optical waveguide layer. Thereby, part of a portion between a top electrode and a bottom electrode may be electrically insulated, and an electric field may be inhibited from applying on a region other than the modulation region. As a result, even when the contact layer is formed in a region other than the modulation region so as to decrease the element resistance, the element capacitance may be suppressed from increasing.

Still furthermore, as an implementation mode, a shielding region, which shields an electric field applied through the contact layer on the optical absorption layer or the optical guide layer, is partially formed in a region in the cladding layer on the optical absorption layer or the optical waveguide layer. Thereby, a region, thereon an electric field is applied in the optical absorption layer or the optical waveguide layer, may be made smaller. As a result, even when the length of the contact layer, which is formed on the optical absorption layer or the optical waveguide layer, is made longer, the element capacitance may be suppressed from increasing. Accordingly, while suppressing the element capacitance from increasing, the element resistance may be lowered, resulting in realization of the high-speed optical modulator.

In the following, an electroabsorption modulator according to embodiments of the present invention and a fabricating method thereof will be explained with reference to the drawings.

FIG. 1A is a perspective view showing a rough configuration of an electroabsorption modulator according to a first embodiment of the present invention, and FIG. 1B is a sectional view obtained by cutting along a C-D line in FIG. 1A. In FIG. 1A, the electroabsorption modulator is provided with an optical modulation region MA of a length Lm and optical coupling regions CA formed on both sides thereof. In the optical modulation region MA and the optical coupling regions CA, a mesa MS, which is formed in stripe in a light incident direction (A-B direction), and grooves MZ, which are formed on both sides thereof, are disposed. The length Lm of the optical modulation region MA may be set at, for instance, 100 μm.

In the optical modulation region MA, as shown in FIG. 1B, an n-InP cladding layer 2 is formed on an n-InP substrate 1, and, in the mesa MS portion, an optical absorption layer 3, p-InP cladding layers 5 and 8, and a p-InGaAs contact layer 9 are formed. The optical absorption layer 3 has a multiple quantum well (MQW) structure and may be formed by combining, for instance, an InGaAsP quantum well layer of 1.5 nm and an InGaAsP barrier layer of 1.3 nm, into 14 pairs.

Furthermore, a silicon oxide film 10 is formed in the portions of the mesa MS and the grooves MZ, and resin 11 is filled in the grooves MZ. An n-side electrode 12 is formed on a back face of the n-InP substrate 1, and a p-side electrode 13 is formed on the mesa MS of the optical modulation region MA.

Meanwhile, in the optical coupling region CA, as shown in FIG. 1A, the n-InP cladding layer 2 is formed on the n-InP substrate 1. In the mesa MS portion, an InGaAsP guide layer 4, the p-InP cladding layers 5 and 8, and the p-InGaAs contact layer 9 are formed, and an AlInAs oxide layer 7, which is obtained by partially oxidizing an AlInAs layer 6 from sidewards, is disposed between the p-InP cladding layers 5 and 8.

In the mesa MS portion where light is inputted, the AlInAs layer 6 is completely oxidized, that is, the AlInAs oxide layer 7 penetrates through sidewards. Accordingly, in the mesa MS portion of the optical coupling region CA, the p-InP cladding layers 5 and 8 are insulated by the AlInAs oxide layer 7.

Furthermore, the silicon oxide film 10 is formed in the portions of the mesa MS and the grooves MZ in the optical coupling region CA, and the resin 11 is filled in the grooves MZ. A composition of the InGaAsP guide layer 4 is set so that an wavelength of, for instance, 1.1 μm may be obtained.

The light inputted into the optical coupling region CA is transferred through the InGaAsP guide layer 4 to the optical modulation region MA. When the light is transferred to the optical modulation region MA, the Stark effect is generated in the optical absorption layer 3, based on a voltage applied to the p-side electrode 13, thereby optical modulation is performed. The modulated light is emitted through the optical coupling region CA.

The p-InP cladding layers 5 and 8 formed in the optical coupling region CA are configured to be the same conductivity type with the p-InP cladding layers 5 and 8 formed in the optical coupling region MA, and the p-InGaAs contact layer 9 is formed not only in the optical modulation region MA but also in the optical coupling region CA.

Thereby, even when the length Lm of the optical modulation region MA is made shorter to suppress the element capacitance, the element resistance may be decreased.

In the mesa MS portion of the optical coupling region CA, the p-InP cladding layers 5 and 8 are insulated by the AlInAs oxide layer 7.

Accordingly, even when the p-InGaAs contact layer 9 is extended to the optical coupling region CA to decrease the element resistance, the element capacitance may be suppressed from increasing.

Figure 13A:
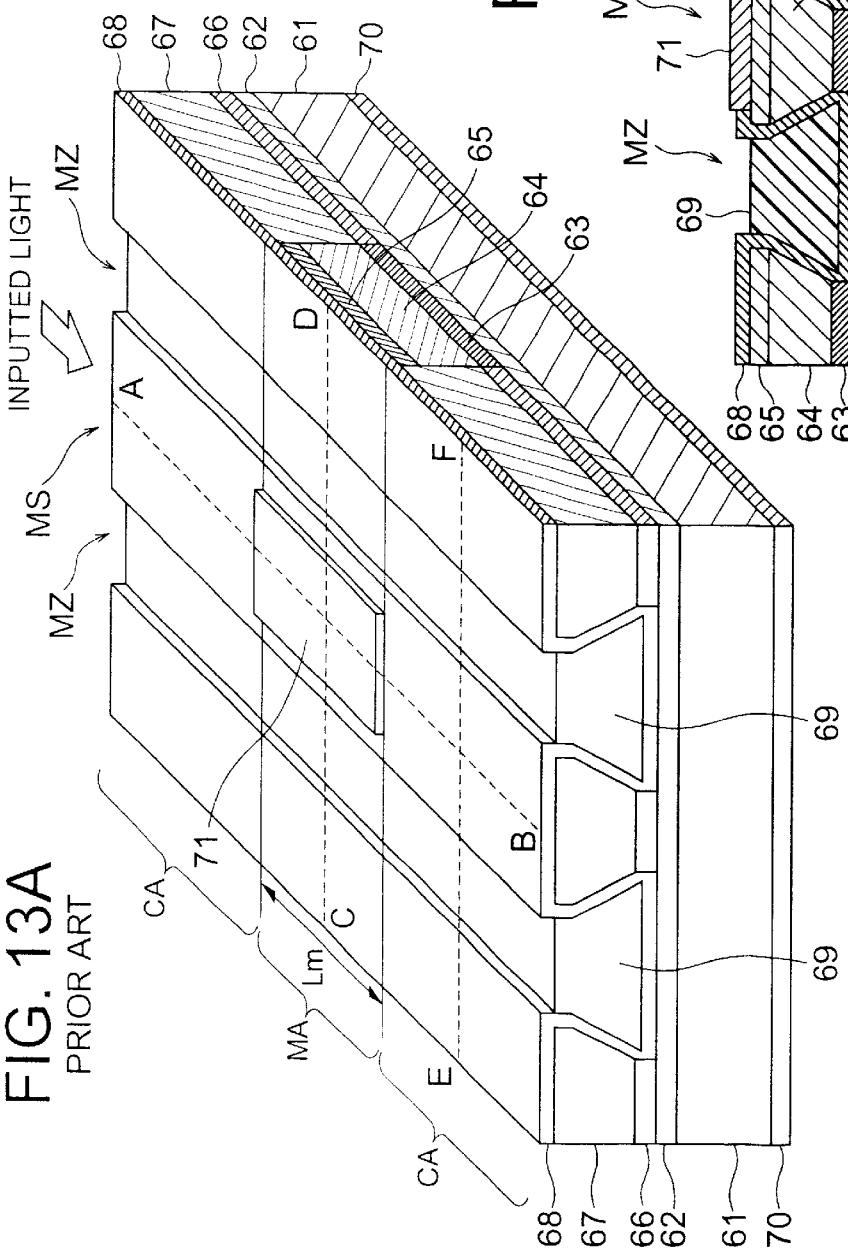
FIG. 13A is a perspective view showing a rough configuration of an existing electroabsorption modulator.
Figure 13B:
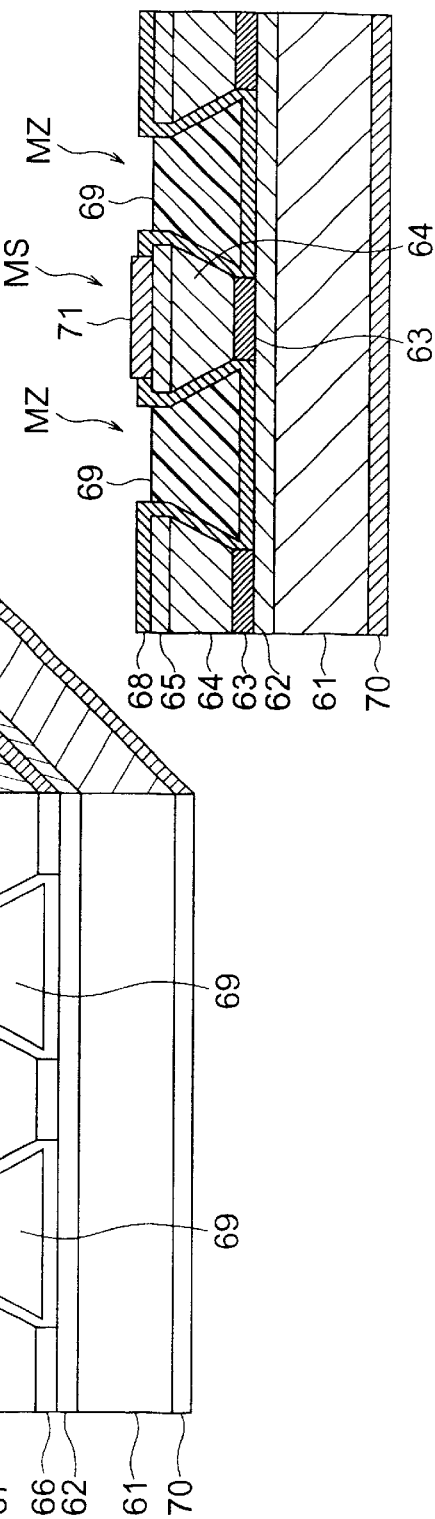
FIG. 13B is a sectional view obtained by cutting along a C-D line in FIG. 13A.
Figure 14A:
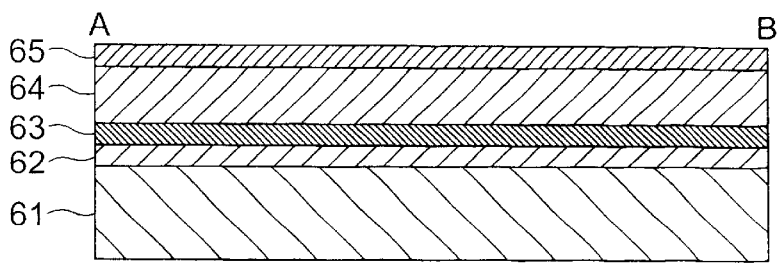
FIG. 14A, FIG. 14B, and FIG. 14D are sectional views obtained by cutting along an A-B line in FIG. 13A, which shows a fabricating process of the existing electroabsorption modulator.
Figure 14B:
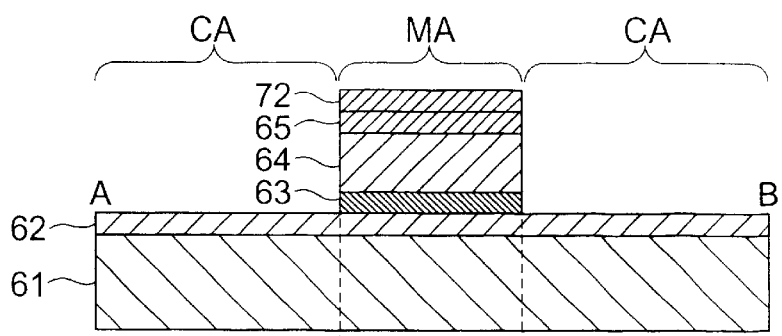
Figure 14C:
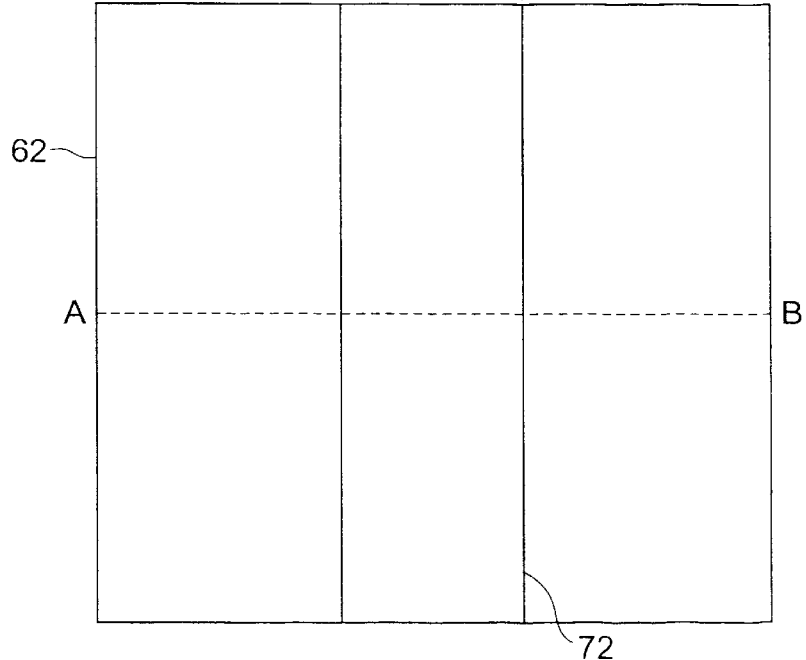
FIG. 14C is a top view in the process shown in FIG. 13B.
Figure 14D:
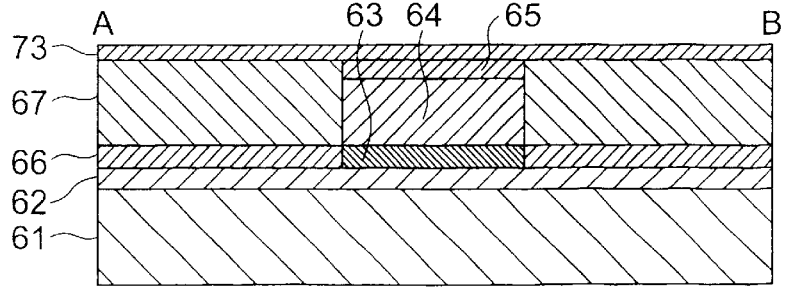
Figure 15A:
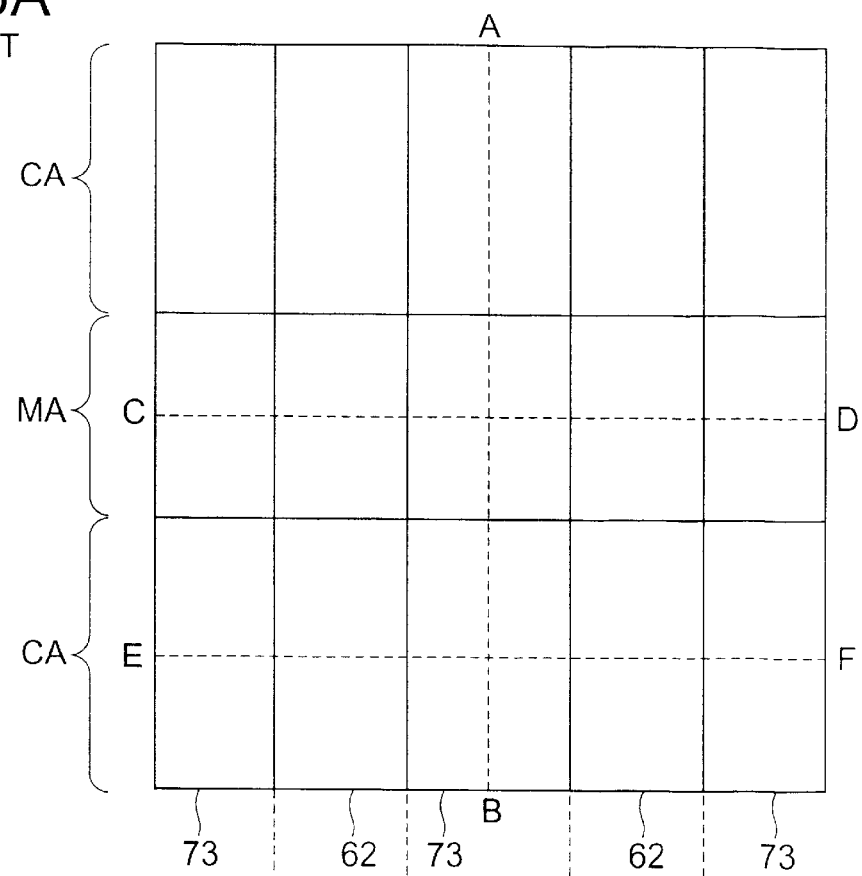
FIG. 15A is a top view showing a fabricating process of the existing electroabsorption modulator.
Figure 15B:
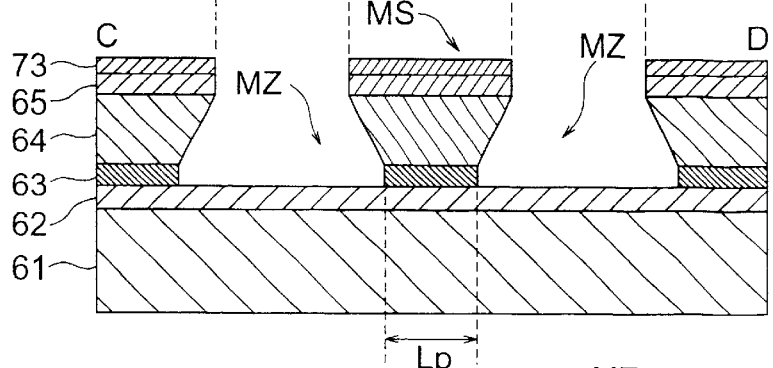
FIG. 15B is a sectional view obtained by cutting along a C-D line in FIG. 13A.
Figure 15C:
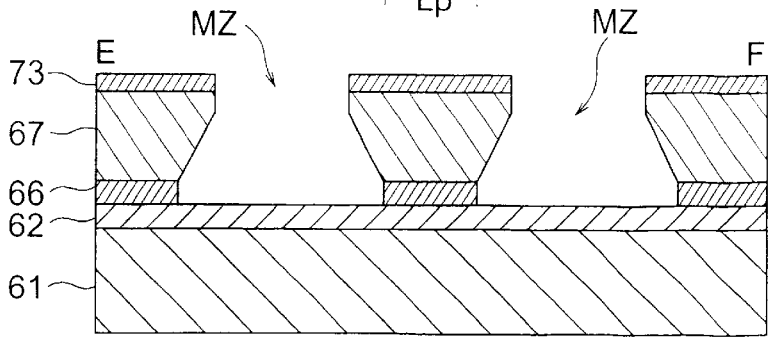
FIG. 15C is a sectional view obtained by cutting along an E-F line in FIG. 13A.
Figure 16A:
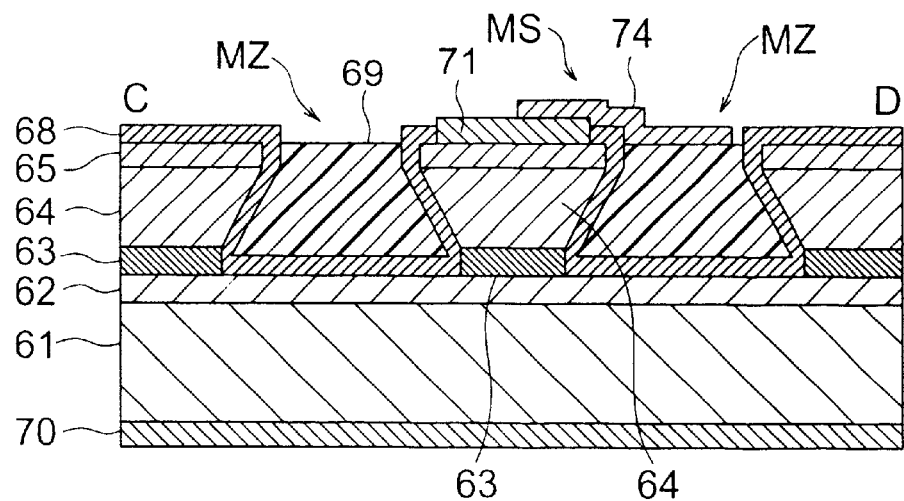
FIG. 16A is a sectional view obtained by cutting along a C-D line in FIG. 13A, which shows the fabricating process of the existing electroabsorption modulator.
Figure 16B:
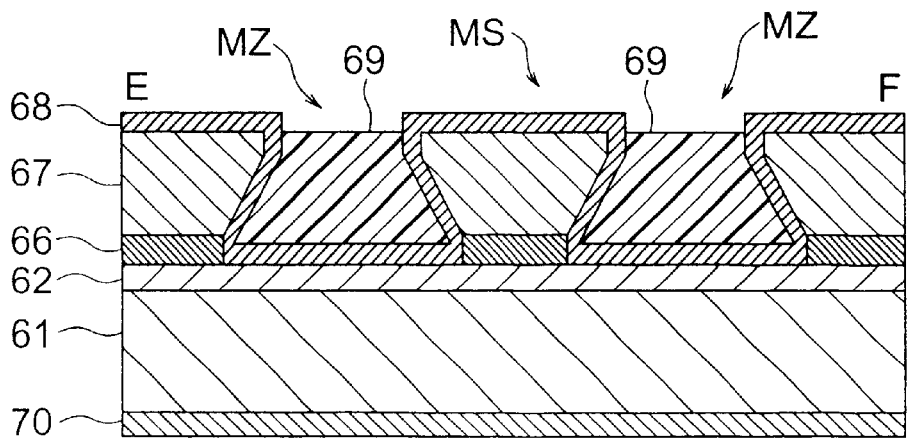
FIG. 16B is a sectional view obtained by cutting along an E-F line in FIG. 13A, which shows the fabricating process of the existing electroabsorption modulator.

FIG. 2A is a diagram showing, in comparison with an existing example, relationship between length and element resistance of the optical modulation region of the electroabsorption modulator according to the first embodiment of the present invention. In FIG. 2A, when the length Lm of the optical modulation region MA is 100 μm, while the existing example, shown in FIG. 13A, shows the element resistance of substantially 20 Ω, the present embodiment shows that the element resistance decreases to substantially 8 Ω.

Figure 2B:
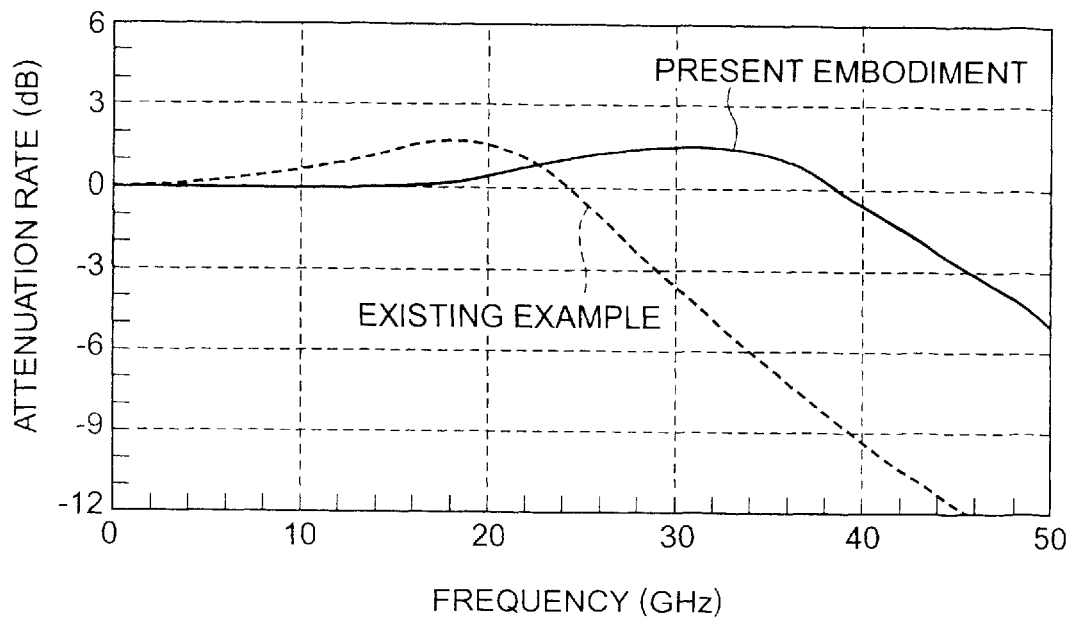
FIG. 2B is a diagram showing, in comparison with an existing example, frequency characteristics of the electroabsorption modulator according to the first embodiment of the present invention.

FIG. 2B is a diagram showing, in comparison with the existing example, frequency characteristics of the electroabsorption modulator according to the first embodiment of the present invention. In FIG. 2B, while the existing example, shown in FIG. 13A, shows the cut-off frequency of substantially 28 GHz, the present embodiment shows the cut-off frequency of substantially 45 GHz. As a result, high-speed operation of the electroabsorption modulator may be realized.

Figure 5A:
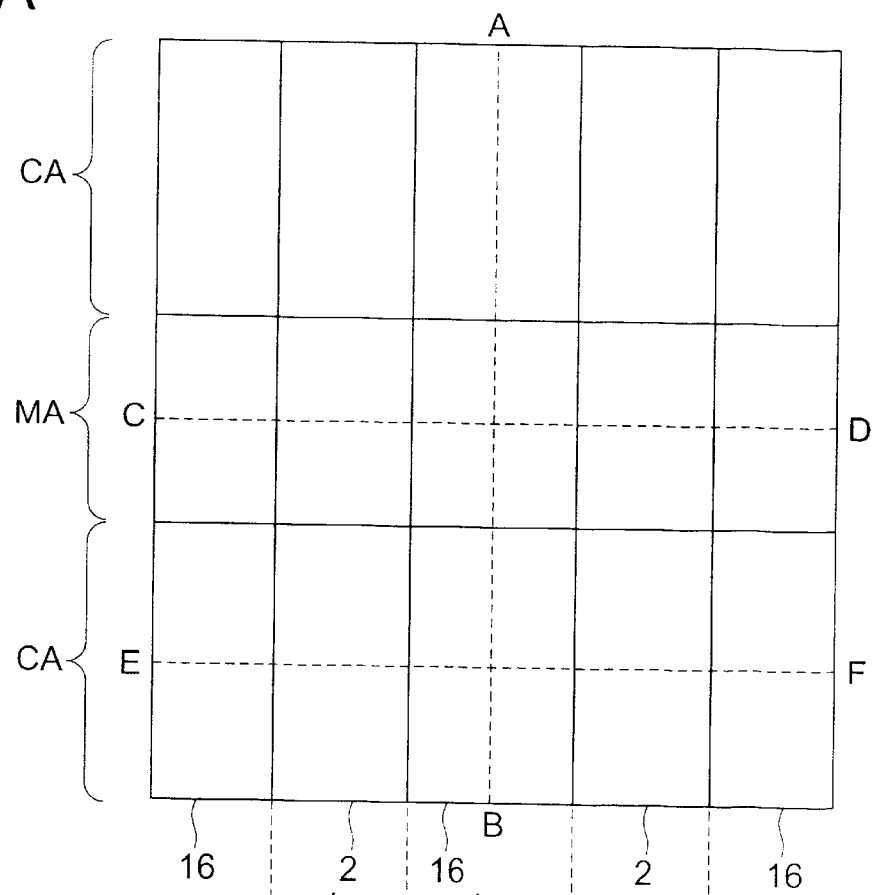
FIG. 5A is a top view showing the fabricating process of the electroabsorption modulator according to the first embodiment of the present invention.
Figure 5B:
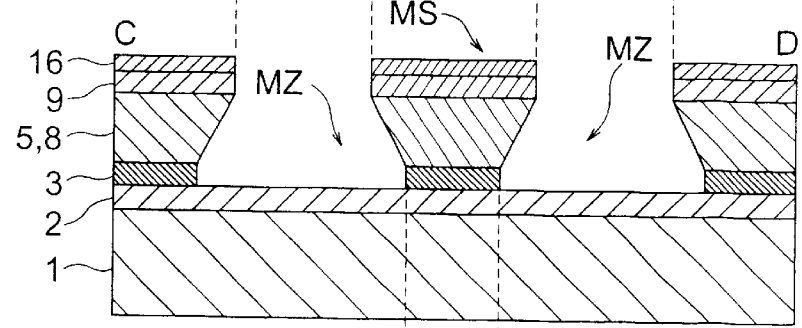
FIG. 5B is a sectional view obtained by cutting along a C-D line in FIG. 5A.
Figure 5C:
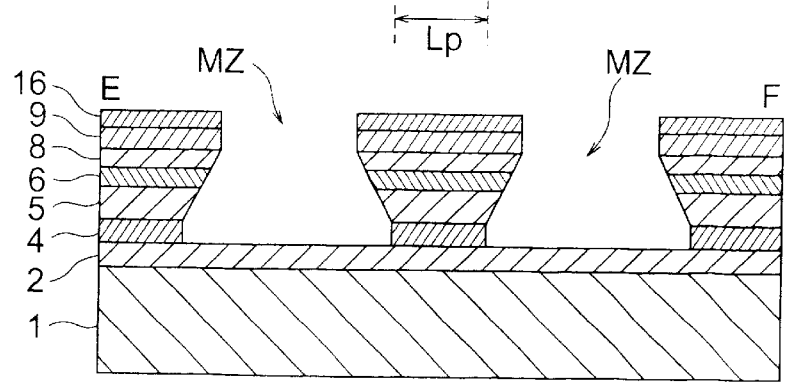
FIG. 5C is a sectional view obtained by cutting along an E-F line in FIG. 5A.
Figure 6A:
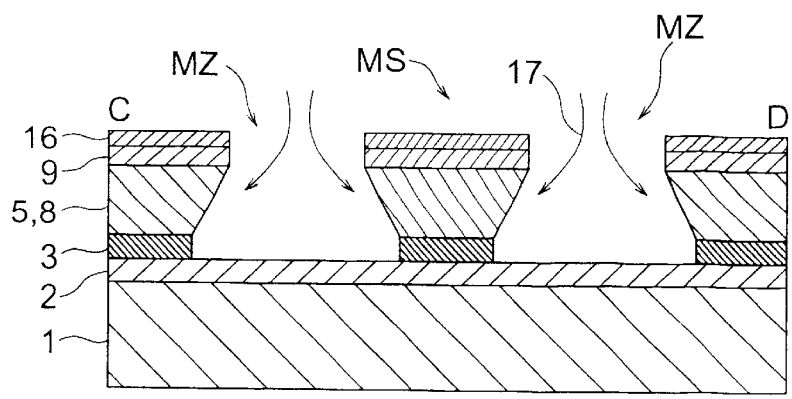
FIG. 6A is a sectional view obtained by cutting along a C-D line in FIG. 1A, which shows a fabricating process of the electroabsorption modulator according to the first embodiment of the present invention.
Figure 6B:
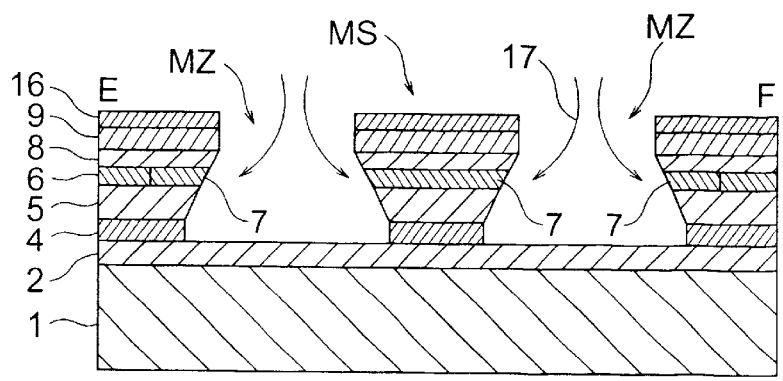
FIG. 6B is a sectional view obtained by cutting along an E-F line in FIG. 1A, which shows a fabricating process of the electroabsorption modulator according to the first embodiment of the present invention.
Figure 6C:
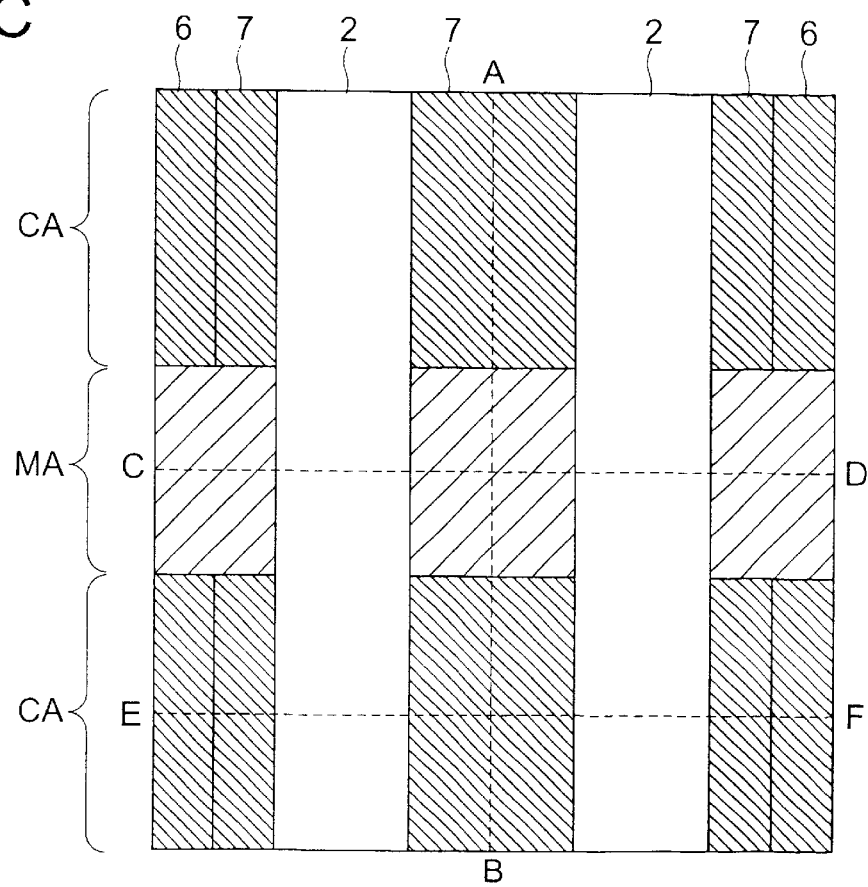
FIG. 6C is a top view obtained by cutting along an AlInAs layer 6 in the process shown in FIG. 6A and FIG. 6B.
Figure 7A:
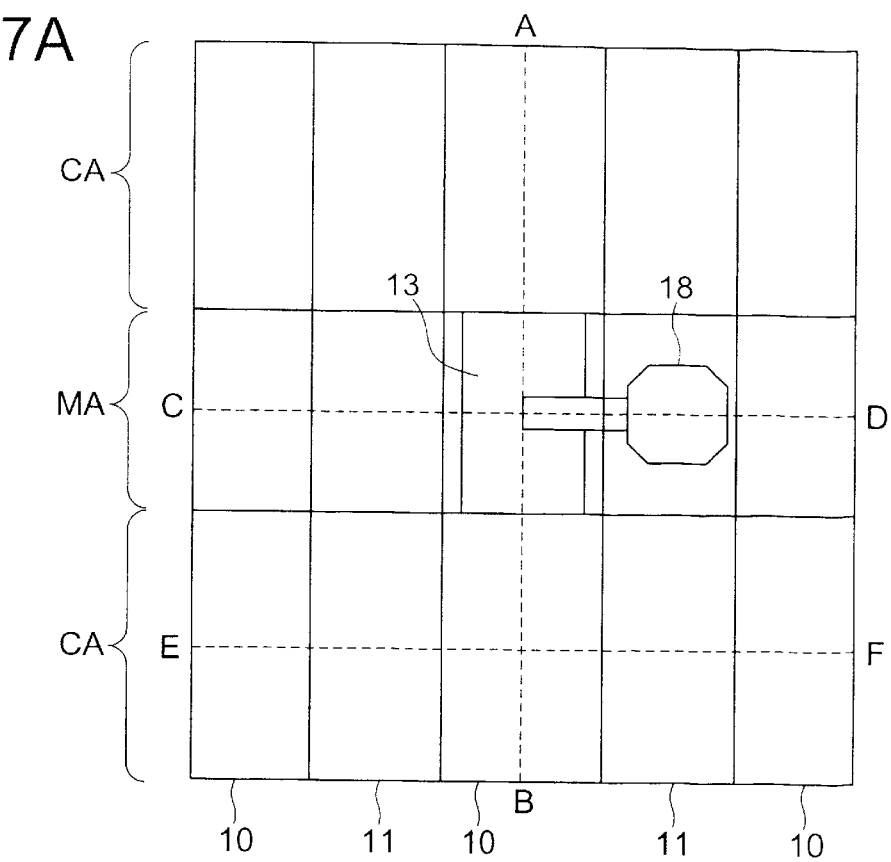
FIG. 7A is a top view showing the fabricating process of the electroabsorption modulator according to the first embodiment of the present invention.
Figure 7B:
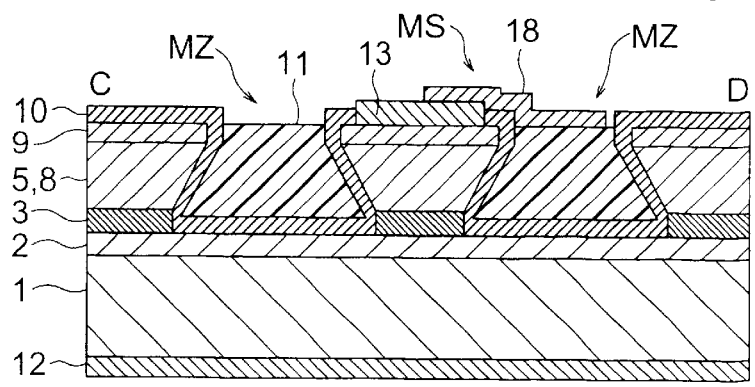
FIG. 7B is a sectional view obtained by cutting along a C-D line in FIG. 7A.
Figure 7C:
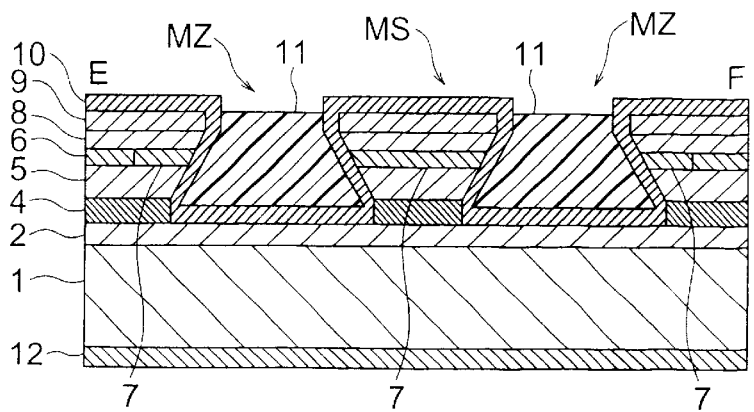
FIG. 7c is a sectional view obtained by cutting along an E-F line in FIG. 7A.

FIG. 3A through FIG. 7C are diagrams showing a sequence of fabricating process of the electroabsorption modulator according to the first embodiment of the present invention. FIG. 3A, FIG. 3B, FIG. 3D, FIG. 4A and FIG. 4C are sectional views obtained by cutting along an A-B line in FIG. 1A; FIG. 5B, FIG. 6A and FIG. 7B are sectional views obtained by cutting along a C-D line in FIG. 1A; and FIG. 5C, FIG. 6B and FIG. 7C are sectional views obtained by cutting along an E-F line in FIG. 1A.

Figure 3A:
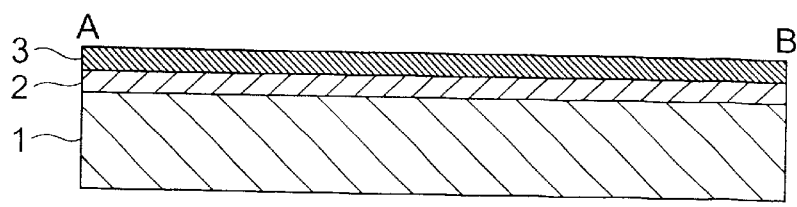
FIG. 3A, FIG. 3B, and FIG. 3D are sectional views obtained by cutting along an A-B line in FIG. 1A, which shows a fabricating process of the electroabsorption modulator according to the first embodiment of the present invention.

In FIG. 3A, the n-InP cladding layer 2 and the optical absorption layer 3 are successively grown on the n-InP substrate 1. These may be deposited by means of, for instance, MOCVD (metal-organic chemical vapor deposition), MBE (molecular beam epitaxy), ALE (atomic layer epitaxy) and so on.

Figure 3B:
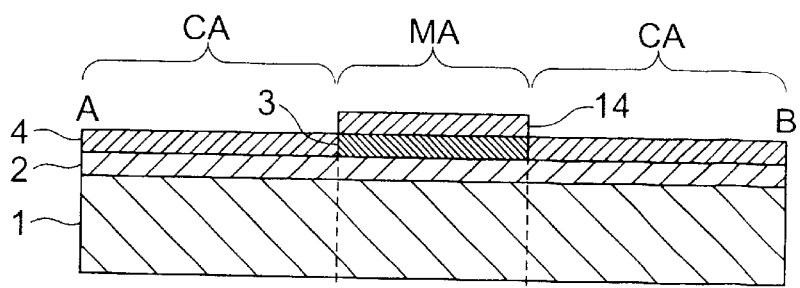
Figure 3C:
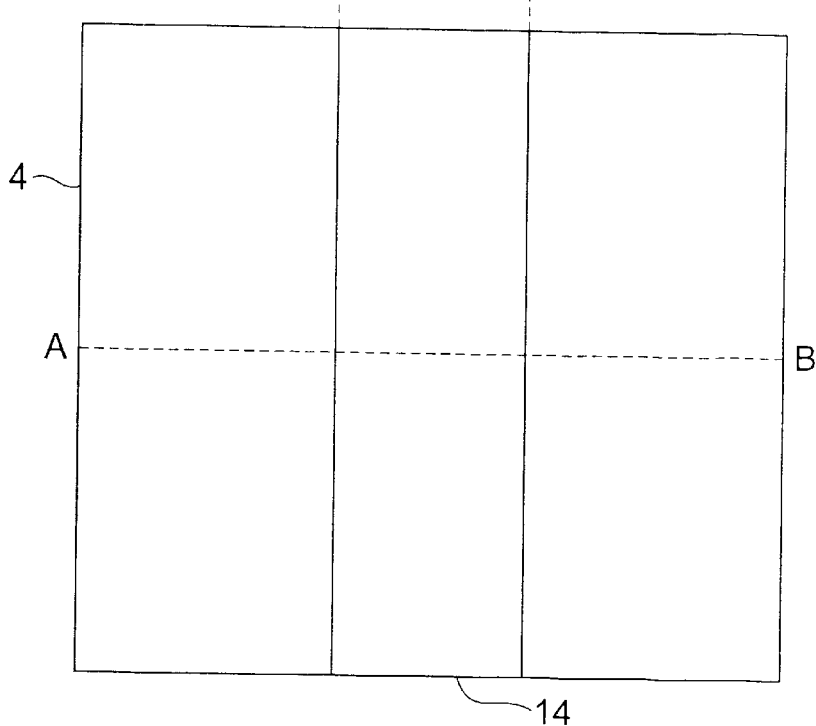
FIG. 3C is a top view in the process shown in FIG. 3B.

Next, as shown in FIG. 3B and FIG. 3C, a silicon oxide film 14 of a width Lm is formed on the optical absorption layer 3, and, with the silicon oxide film 14 as a mask, etching, such as RIE, is performed to remove the optical absorption layer 3 of the optical coupling region CA. Then, by performing deposition, such as MOCVD and so on, with the silicon oxide film 14 as the mask, the InGaAsP guide layer 4 is selectively grown on the optical coupling region CA. By depositing the InGaAsP guide layer 4 on the optical coupling region CA, the InGaAsP guide layer 4 and the optical absorption layer 3 are allowed to optically couple.

Figure 3D:
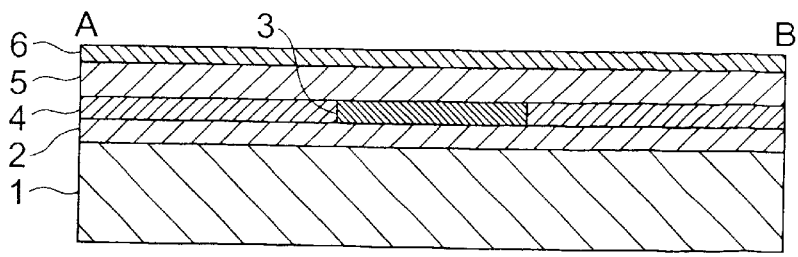

Next, as shown in FIG. 3D, the silicon oxide film 14 is removed, and the p-InP cladding layer 5 and the n-AlInAs layer 6 are deposited on an entire surface by means of MOCVD or the like.

Figure 4A:
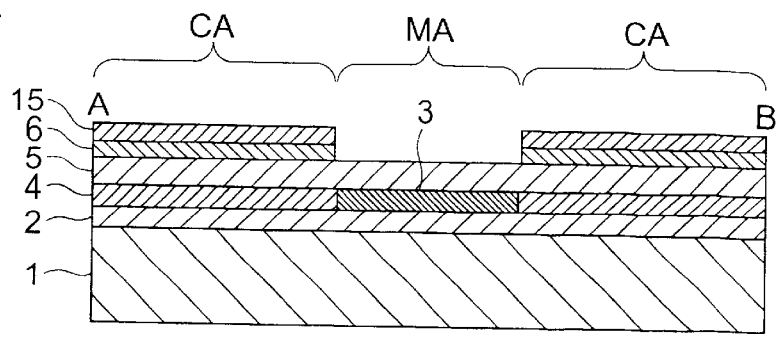
FIG. 4A and FIG. 4C are sectional views obtained by cutting along an A-B line in FIG. 1A, which shows a fabricating process of the electroabsorption modulator according to the first embodiment of the present invention.
Figure 4B:
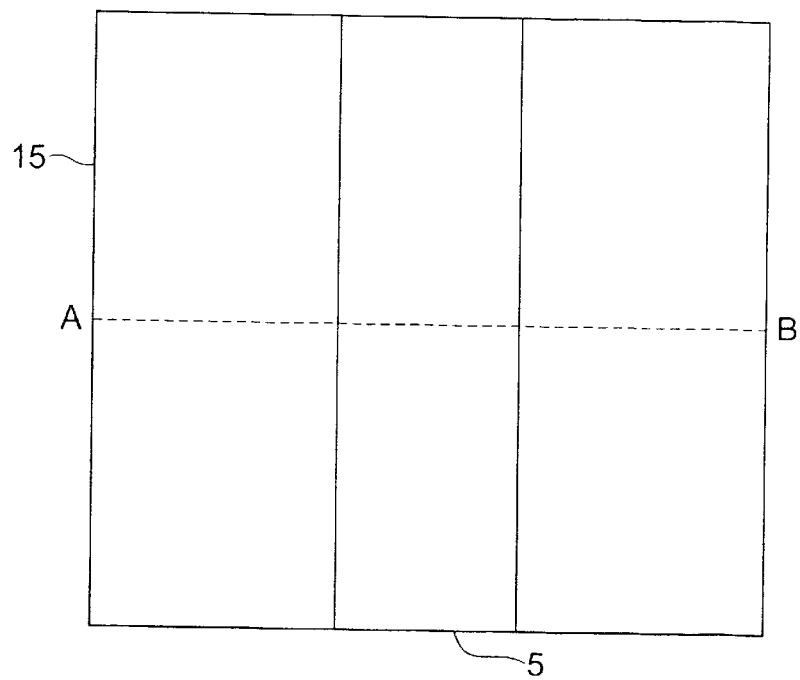
FIG. 4B is a top view in the process shown in FIG. 4A.

Next, as shown in FIG. 4A and FIG. 4B, a silicon oxide film 15 is deposited on an entire surface by means of CVD and so on. Thereafter, the silicon oxide film 15 of the optical modulation region MA is removed by use of photolithography and etching. Then, with the silicon oxide film 15 as the mask, etching, such as RIE or the like, is performed to remove the n-AlInAs layer 6 of the optical modulation region MA.

Figure 4C:
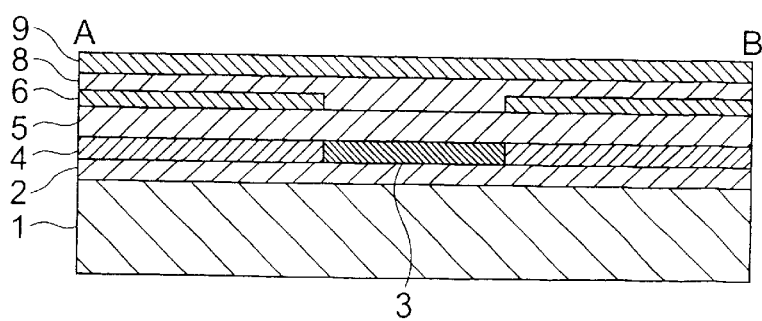

Next, as shown in FIG. 4C, after the silicon oxide film 15 is removed, the p-InP cladding layer 8 and the p-InGaAs contact layer 9 are deposited on the entire surface by means of MOCVD or the like.

Next, as shown in FIG. 5A, FIG. 5B and FIG. 5C, after a silicon oxide film 16 is deposited on an entire surface by means of CVD or the like, the silicon oxide film 16 is patterned in stripes corresponding to the mesa MS and the grooves MZ by use of the photolithography and etching. Then, with the patterned silicon oxide film 16 as the mask, chemical etching is performed. Thereby, the optical absorption layer 3, the p-InP cladding layers 5 and 8, and the p-InGaAs contact layer 9 in the groove MZ portion of the optical modulation region MA are removed in mesa, and the InGaAsP guide layer 4, the p-InP cladding layers 5 and 8, the n-AlInAs layer 6 and the p-InGaAs contact layer 9 in the groove MZ portion of the optical modulation region MA are removed in mesa. Thereby, the optical absorption layers 3 of the mesa MS may be separated by the grooves MZ.

The length Lm of the optical modulation region MA may be set at, for instance, 100 $\mu$m, the width Ls of the mesa MS at, for instance, 5 $\mu$m, and the width Lp of the optical absorption layer 3 at, for instance, 2 $\mu$m. The optical absorption layer 3 of the mesa MS corresponding to this region performs optical modulation.

The etching into mesa may be performed by use of, for instance, sulfuric acid based etchant or hydrogen bromide based etchant.

Next, as shown in FIG. 6A, FIG. 6B and FIG. 6C, an wafer is inserted in a furnace of an oxidizing atmosphere 17, thereby oxidizing the n-AlInAs layer 6. The oxidation of the n-AlInAs layer 6 is performed from sideward of the n-AlInAs layer 6 by the oxidizing atmosphere 17, and thereby at least up to a length half the width Ls=5 $\mu$m of the mesa MS the n-AlInAs layer 6 is oxidized. Thereby, the AlInAs oxide layer 7 of high resistance is formed in the p-InP cladding layers 5 and 8, and at least in the mesa MS portion in the optical coupling region CA, the AlInAs oxide layer 7 penetrates through the p-InP cladding layers 5 and 8.

FIG. 6C is a top view obtained by cutting along the AlInAs layer 6 in the process of FIG. 6B. In FIG. 6C, in the mesa MS of the optical coupling region CA, the p-InP cladding layer 5 is completely covered by the AlInAs oxide layer 7, and the n-AlInAs layers 6 on both sides of the grooves MZ are also partially oxidized. Thereby, the AlInAs oxide layers 7 are formed.

Accordingly, even when the p-InGaAs contact layer 9 is formed in the mesa MS portion in the optical coupling region CA, an electric field may be inhibited from applying on a PN junction region positioned lower than the AlInAs oxide layer 7. Thereby, the element capacitance may be decreased.

Next, as shown in FIG. 7A, FIG. 7B and FIG. 7C, after the silicon oxide film 16 is removed, the silicon oxide film 10 is deposited on an entire surface by means of the CVD and so on, and furthermore followed by coating of the resin 11 and curing. Then, the resin 11 is etched by means of the RIE or the like, resulting in filling the resin 11 only in the grooves MZ.

Next, the p-side electrode 13 is formed in the mesa MS portion of the optical modulation region MA, and furthermore a bonding pad 18 is formed. Thereafter, the n-InP substrate 1 is ground to substantially 100 $\mu$m, and the n-side electrode 12 is formed on the back face of the n-InP substrate 1.

Thus, in the aforementioned first embodiment, the p-InGaAs contact layer 9 of low electric resistance may be formed on the entire surface of the mesa MS, not only in the optical modulation region MA but also in the other region than that. Accordingly, contact resistance with the p-side electrode 13 may be allowed not to largely depend on the length Lm of the optical modulation region MA, resulting in a decrease of the element resistance.

Furthermore, since the AlInAs oxide layer 7 may be formed between the p-InP cladding layers 5 and 8, an electric field may be hindered from applying on a region other than the optical modulation region MA, thereby, even when the p-InGaAs contact layer 9 is formed in a region other than the optical modulation region MA, the element capacitance may be suppressed from increasing.

The aforementioned embodiment explains how to form the n-AlInAs layer 6 between the p-InP cladding layers 5 and 8. However, whenever being capable of oxidizing and depositing, it may be applied to other than the AlInAs film.

FIG. 8A is a perspective view showing a rough configuration of an electroabsorption modulator according to a second embodiment of the present invention, and FIG. 8B is a sectional view obtained by cutting along a C-D line in FIG. 8A. In FIG. 8A, the electroabsorption modulator is provided with an optical modulation region MA of a length Lm and optical coupling regions CA formed on both sides thereof. In the optical modulation region MA and the optical coupling regions CA, a mesa MS, which is formed in stripe in a light incident direction (A-B direction), and grooves MZ, which are formed on both sides thereof, are disposed. The length Lm of the optical modulation region MA may be set at, for instance, 100 $\mu$m.

In the optical modulation region MA, as shown in FIG. 8B, an n-InP cladding layer 22 is formed on an n-InP substrate 21, and, in the mesa MS portion, an optical absorption layer 23, a p-InP cladding layer 25 and a p-InGaAs contact layer 26 are formed. The optical absorption layer 23 has a multiple quantum well (MQW) structure and is formed by combining, for instance, an InGaAsP quantum well layer of 1.5 nm and an InGaAsP barrier layer of 1.3 nm, in 14 pairs.

Furthermore, a silicon oxide film 28 is formed in the mesa MS and groove MZ portions, and resin 29 is filled in the grooves MZ. An n-side electrode 30 is formed on a back face of the n-InP substrate 1, and a p-side electrode 31 is formed on the mesa MS of the optical modulation region MA.

Meanwhile, in the optical coupling region CA, as shown in FIG. 8A, the n-InP cladding layer 22 is formed on the n-InP substrate 21, and, in the mesa MS portion, an InGaAsP guide layer 24, the p-InP cladding layer 25 and the p-InGaAs contact layer 26 are formed. In addition, in the mesa MS and groove MZ portions of the optical coupling region CA, a silicon oxide film 28 is formed, and the resin 29 is filled in the grooves MZ. A composition of the InGaAsP guide layer 24 may be set so that a wavelength of, for instance, 1.1 μm may be obtained.

The width of the mesa 32 of the optical modulation region MA is larger than that of the mesa 34 of the optical coupling region CA. Furthermore, in order to suppress an optical coupling loss, a taper portion 33 is disposed between the mesa 32 and the mesa 34.

Furthermore, proton implanted regions 27 are disposed, inclining in a depth direction, along side-walls of the mesas 32 and 34 and the taper portion 33, and the proton implanted regions 27 traverse sidewards through the p-InP cladding layer 25 in the mesa 34 of the optical coupling region CA. Accordingly, the p-InGaAs contact layer 26 of the mesa MS portion in the optical coupling region CA is insulated due to the proton implanted region 27.

Light inputted in the optical coupling region CA is transferred through the InGaAsP guide layer 24 to the optical modulation region MA. Upon the light being transferred to the optical modulation region MA, the Stark effect is generated in the optical absorption layer 23 based on a voltage applied to the p-side electrode 31, resulting in optical modulation. The modulated light is emitted through the optical coupling region CA.

The p-InP cladding layer 25 formed in the optical coupling region CA is configured so as to be the same conductivity type with the p-InP cladding layer 25 formed in the optical modulation region MA, and the p-InGaAs contact layer 26 is formed not only in the optical modulation region MA but also in the optical coupling region CA.

Thereby, even when the length Lm of the optical modulation region MA is made shorter to suppress the element capacitance, the element resistance may be decreased.

In the mesa MS portion of the optical coupling region CA, the p-InP cladding layer 25 is insulated by the proton implanted region 27.

Accordingly, even when the p-InGaAs contact layer 26 is extended to the optical coupling region CA to decrease the element resistance, the element capacitance may be suppressed from increasing.

Figure 9A:
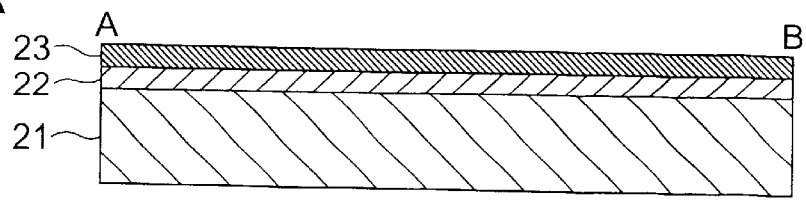
FIG. 9A, FIG. 9B, and FIG. 9D are sectional views obtained by cutting along an A-B line in FIG. 8A, which shows a fabricating process of the electroabsorption modulator according to the second embodiment of the present invention.
Figure 10A:
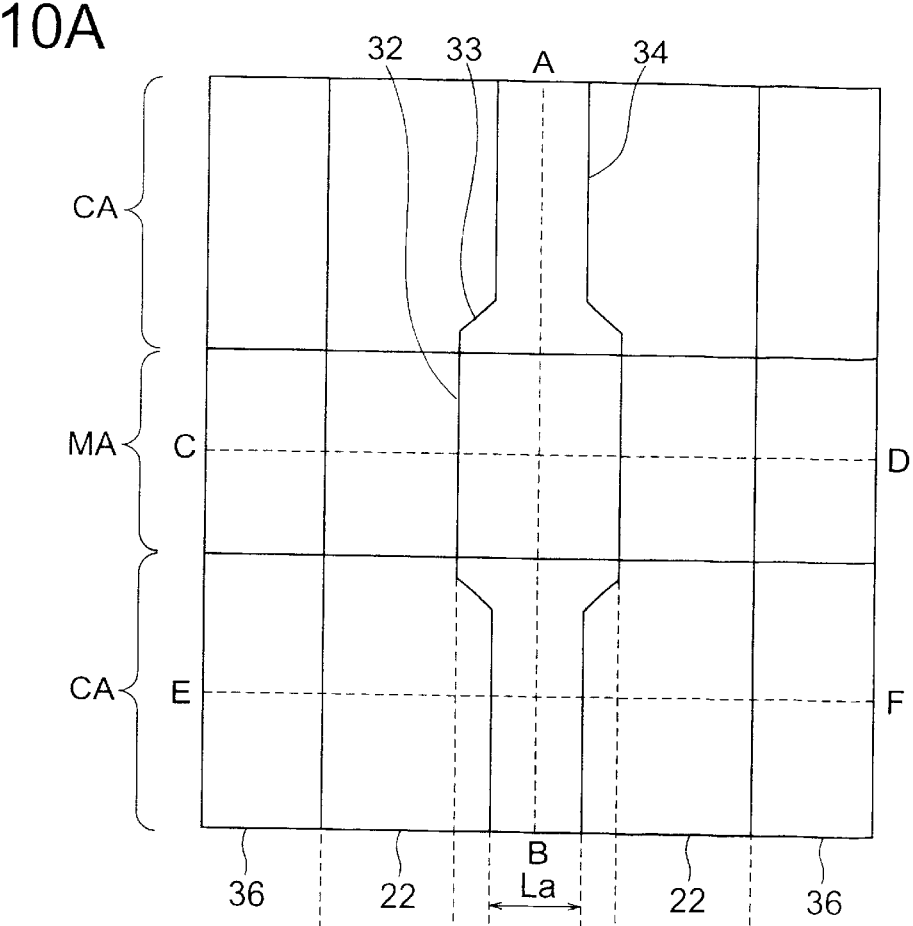
FIG. 10A is a top view showing the fabricating process of the electroabsorption modulator according to the second embodiment of the present invention.
Figure 10B:
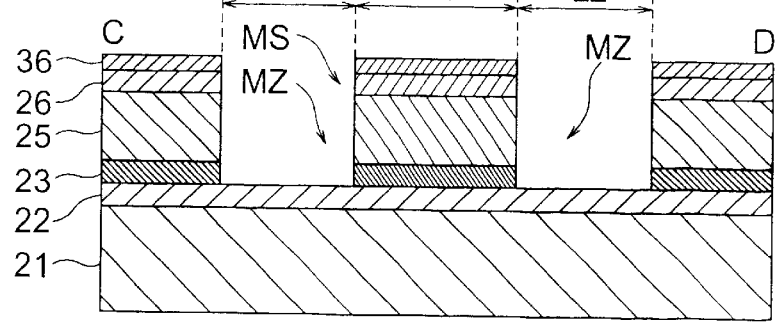
FIG. 10B is a sectional view obtained by cutting along a C-D line in FIG. 10A.
Figure 10C:
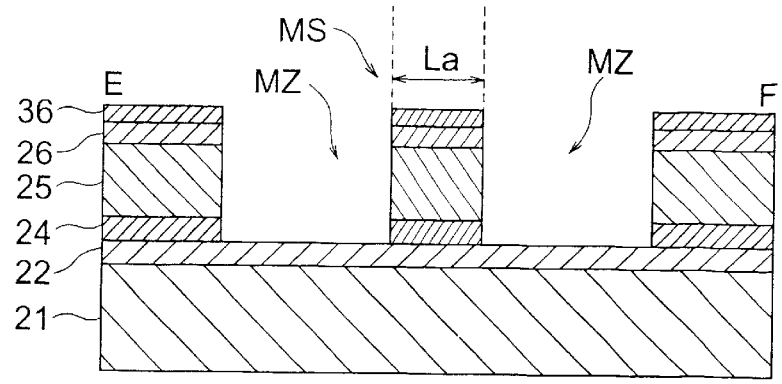
FIG. 10C is a sectional view obtained by cutting along an E-F line in FIG. 10A.
Figure 11A:
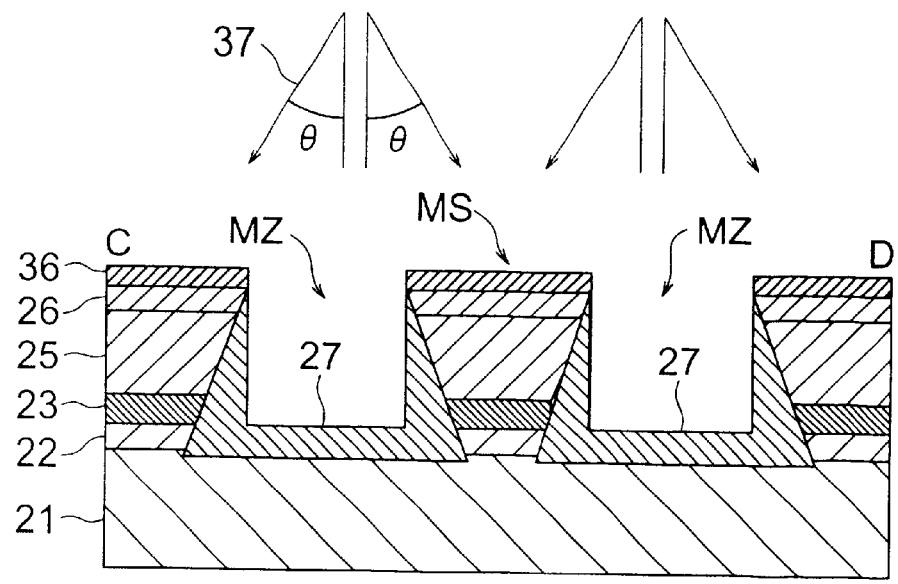
FIG. 11A is a sectional view obtained by cutting along a C-D line in FIG. 8A, which shows the fabricating process of the electroabsorption modulator according to the second embodiment of the present invention.
Figure 11B:
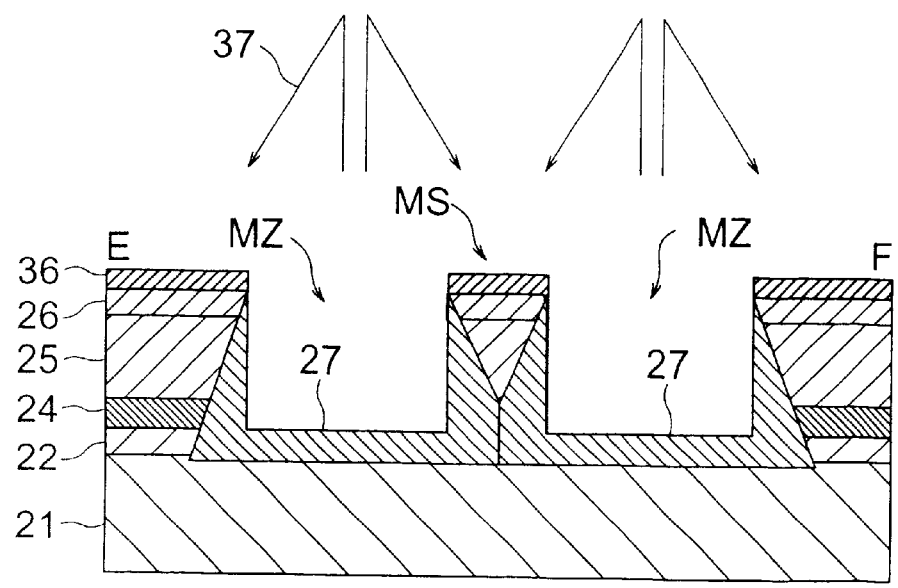
FIG. 11B is a sectional view obtained by cutting along an E-F line in FIG. 8A, which shows the fabricating process of the electroabsorption modulator according to the second embodiment of the present invention.
Figure 12A:
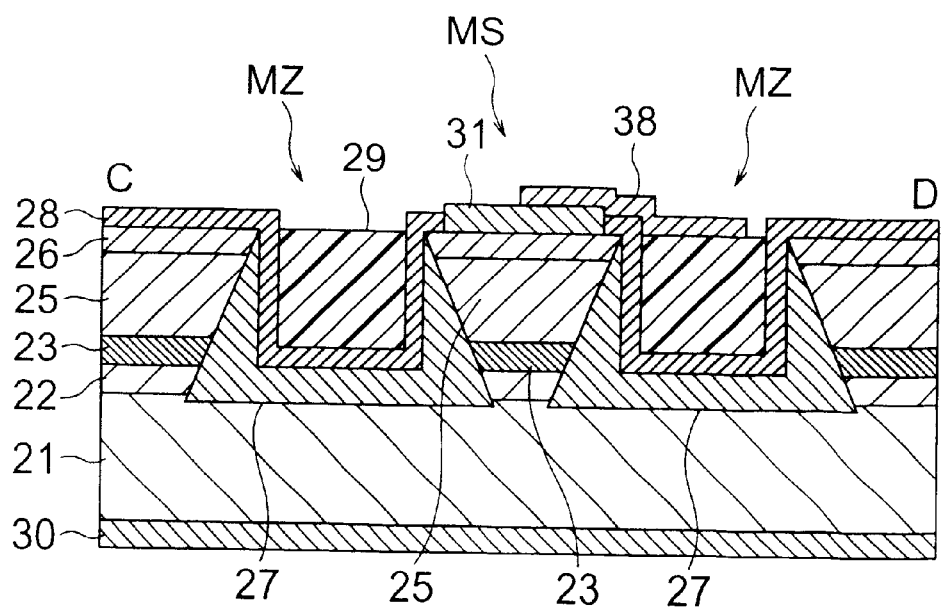
FIG. 12A is a sectional view obtained by cutting along a C-D line in FIG. 8A, which shows the fabricating process of the electroabsorption modulator according to the second embodiment of the present invention.
Figure 12B:
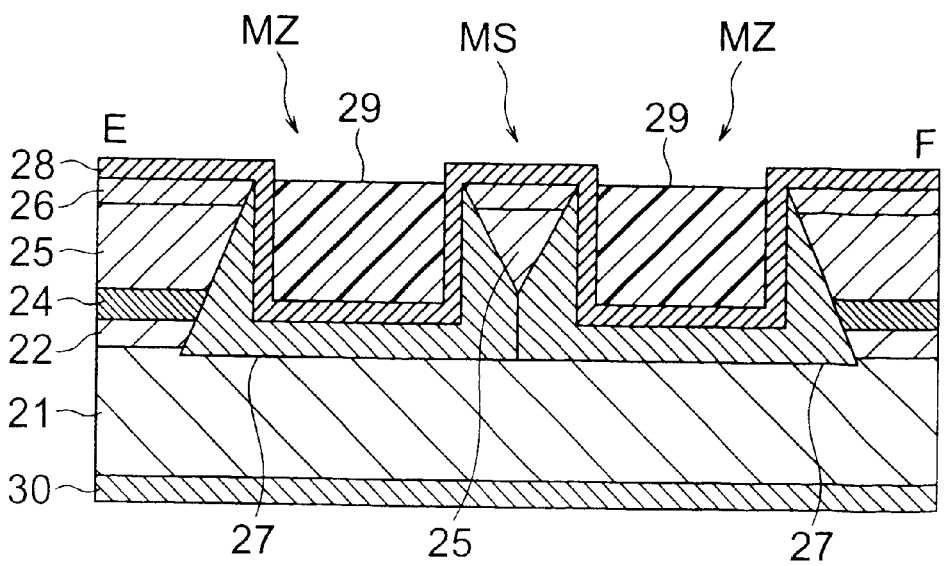
FIG. 12B is a sectional view obtained by cutting along an E-F line in FIG. 8A, which shows the fabricating process of the electroabsorption modulator according to the second embodiment of the present invention.

FIG. 9A through FIG. 12B are diagrams showing a sequence of fabricating process of an electroabsorption modulator according to the second embodiment of the present invention. FIG. 9A, FIG. 9B, and FIG. 9D are sectional views obtained by cutting along an A-B line in FIG. 8A; FIG. 10B, FIG. 11A and FIG. 12A are sectional views obtained by cutting along a C-D line in FIG. 8A; and FIG. 10C, FIG. 11B and FIG. 12B are sectional views obtained by cutting along an E-F line of FIG. 8A.

In FIG. 9A, the n-InP cladding layer 22 and the optical absorption layer 23 are successively grown on the n-InP substrate 21 by means of the MOCVD or the like.

Figure 9B:
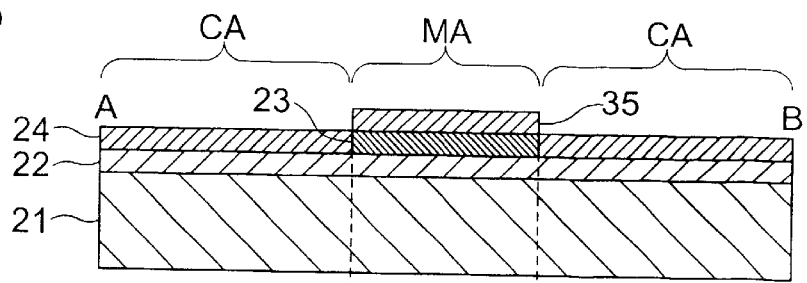
Figure 9C:
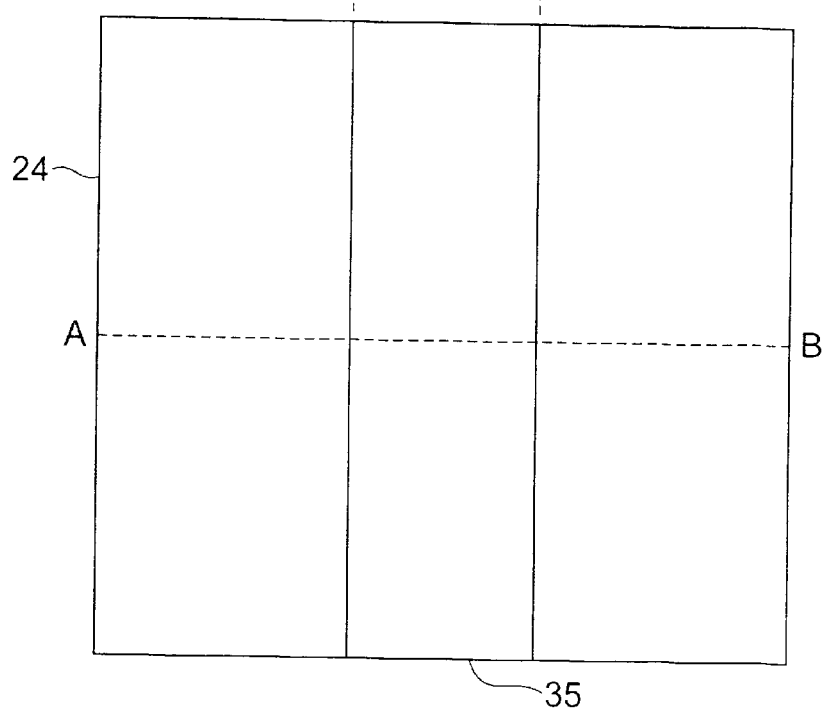
FIG. 9C is a top view in the process shown in FIG. 9B.

Next, as shown in FIG. 9B and FIG. 9C, a silicon oxide film 35 of a width Lm is formed on the optical absorption layer 23, and, with the silicon oxide film 35 as the mask, etching, such as RIE, is performed to remove the optical absorption layer 23 in the optical coupling region CA. Then, by performing deposition, such as MOCVD and so on, with the silicon oxide film 35 as the mask, the InGaAsP guide layer 24 is selectively grown on the optical coupling region CA. By depositing the InGaAsP guide layer 24 in the optical coupling region CA, the InGaAsP guide layer 24 and the optical absorption layer 23 are allowed to optically couple.

Figure 9D:
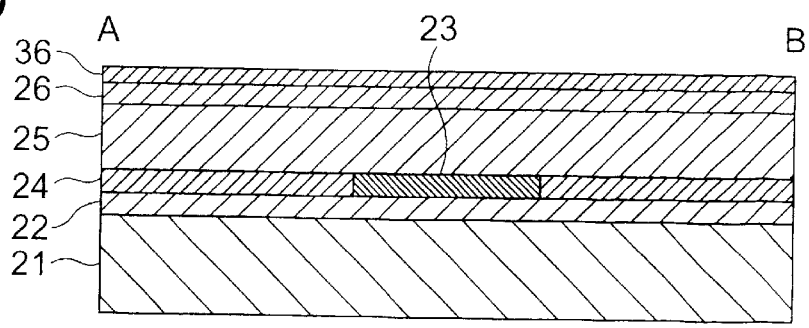

Next, as shown in FIG. 9D, the silicon oxide film 35 is removed, and the p-InP cladding layer 25 and the p-InGaAs contact layer 26 are deposited on an entire surface by means of MOCVD or the like. Then, a silicon oxide film 36 is deposited on an entire surface by means of the CVD or the like.

Then, as shown in FIG. 10A, FIG. 10B and FIG. 10C, the silicon oxide film 36 is patterned in stripes corresponding to the mesa MS and the grooves MZ by use of photolithography and etching. Then, with the patterned silicon oxide film 36 as the mask, etching, such as RIE or the like, is performed to remove the optical absorption layer 23, the p-InP cladding layer 25 and the p-InGaAs contact layer 26 in the groove MZ portion of the optical modulation region MA, and the InGaAsP guide layer 24, the p-InP cladding layer 25 and the p-InGaAs contact layer 26 in the groove MZ portion of the optical coupling region CA are removed. Thereby, the optical absorption layer 23 of the mesa MS may be separated by the grooves MZ.

A width Lb of the mesa 32 of the optical modulation region MA is set larger than a width La of the mesa 34 in the optical coupling region CA, and the mesa 32 is connected to the mesa 34 through the taper portion 33.

Next, as shown in FIG. 11A and FIG. 11B, while, with respect to a main face of the wafer, tilting a predetermined tilt angle θ in both directions from a vertical plane, ion implantation 37 with protons is performed twice, thereby the proton implanted region 27 is formed. The tilt angle θ, as shown in FIG. 11B, is set so that the proton implantation region 27 of the mesa 34 penetrates sidewards through the p-InP cladding layer 25, when the ion implantation 37 of the proton is performed at a predetermined energy, and may be set at, for instance, the tilt angle θ=±30 degrees.

Since the width of the mesa 32 is larger than that of the mesa 34, even when the proton implanted region 27 of the mesa 34 penetrates through sidewards, as shown in FIG. 11A, the proton implanted regions 27 of the mesa 32 may be made not to penetrate sidewards through the p-InP cladding layer 25. Thereby, the optical absorption layer 23 may be left in the mesa 32.

As a result, even when the p-InGaAs contact layer 9 is formed in the mesa MS portion in the optical coupling region CA, an electric field may be hindered from applying at a PN junction region in the proton implanted region 27 in the optical coupling region CA, resulting in a decrease of the element capacitance.

Next, as shown in FIG. 12A and FIG. 12B, after the silicon oxide film 36 is removed, the silicon oxide film 28 is deposited on an entire surface by means of the CVD and so on, followed by coating the resin 29 and curing. Then, the resin 29 is etched by means of the RIE or the like, thereby filling the resin 29 only in the groove MZ portion.

Next, the p-side electrode 31 is formed in the mesa MS portion of the optical modulation region MA, and furthermore a bonding pad 38 is formed. Thereafter, the n-InP substrate 21 is ground to substantially 100 μm, and the n-side electrode 30 is formed on the back face of the n-InP substrate 21.

Thus, in the aforementioned second embodiment, the p-InGaAs contact layer 26 of low electric resistance may be formed on the entire surface of the mesa MS, not only in the optical modulation region MA but also in the other region. Accordingly, contact resistance with the p-side electrode 31 may be set not to largely depend on the length Lm of the optical modulation region MA, resulting in reducing the element resistance.

Furthermore, since the proton implanted region 27 may be formed in the p-InP cladding layer 25, an electric field may be inhibited from applying at a region other than the optical modulation region MA. Accordingly, even when the p-InGaAs contact layer 26 is disposed in a region other than the optical modulation region MA, the element capacitance may be suppressed from increasing.

In the aforementioned embodiments, InGaAsP/InP based material is taken for explanation. However, GaAs/AlGaAs based material and AlGaInP based material may be used.

While the invention has been described in terms of specific embodiments thereof, it is not intended to be limited thereto but rather only to the extent set forth hereafter in the following claims.

What is claimed is:

1. An electroabsorption modulator, comprising:
   a first conductivity type cladding layer formed on a first conductivity type substrate;
   an optical absorption layer formed on the first conductivity type cladding layer;
   a second conductivity type cladding layer formed on the optical absorption layer;
   a contact layer formed on the second conductivity type cladding layer; and
   a high resistance layer partially formed in a region in an optical propagation direction of the second conductivity type cladding layer.

2. An electroabsorption modulator as set forth in claim 1:
   wherein the high resistance layer is a semiconductor oxide layer formed in the second conductivity type cladding layer.

3. An electroabsorption modulator as set forth in claim 1:
   wherein the high resistance layer is a proton implanted layer formed in the second conductivity type cladding layer.

4. An electroabsorption modulator, comprising:
   a first conductivity type cladding layer formed on a first conductivity type substrate;
   an optical absorption layer formed on the first conductivity type cladding layer;
   an optical waveguide layer that is formed on the first conductivity type cladding layer so as to optically couple with the optical absorption layer and has a stripe width larger than that of the optical absorption layer;
   a second conductivity type cladding layer formed on the optical absorption layer and the optical waveguide layer;
   a contact layer formed on the second conductivity type cladding layer; and
   a proton implanted layer obliquely formed on the second conductivity type cladding layer.

5. An electroabsorption modulator as set forth in claim 4:
   wherein the proton implanted layer runs through on the optical waveguide layer.

6. An electroabsorption modulator:
   wherein a shielding region, which shields an electric field applied through a contact layer to an optical absorption layer or an optical guide layer, is partially formed in a cladding layer on the optical absorption layer or the optical waveguide layer.

7. A fabricating method of an electroabsorption modulator, comprising:
   forming a first conductivity type cladding layer on a first conductivity type substrate;
   forming an optical absorption layer on the first conductivity type cladding layer;
   forming an optical waveguide layer, which is optically coupled with the optical absorption layer, on the first conductivity type cladding layer;
   forming a second conductivity type cladding layer on the optical absorption layer and the optical waveguide layer;
   forming an oxidizable semiconductor layer in a region corresponding to on the optical waveguide layer in the second conductivity type cladding layer;
   forming a contact layer on the second conductivity type cladding layer;
   etching the contact layer, the second conductivity type cladding layer, the oxidizable semiconductor layer, the optical absorption layer and the optical waveguide layer, in stripes; and
   oxidizing the oxidizable semiconductor layer from a sidewall of the stripe.

8. A fabricating method of an electroabsorption modulator, comprising:
   forming a first conductivity type cladding layer on a first conductivity type substrate;
   forming an optical absorption layer on the first conductivity type cladding layer;
   forming an optical waveguide layer, which is optically coupled with the optical absorption layer, on the first conductivity type cladding layer;
   forming a second conductivity type cladding layer on the optical absorption layer and the optical waveguide layer;
   forming a contact layer on the second conductivity type cladding layer;
   etching the contact layer, the second conductivity type cladding layer, the optical absorption layer and the optical waveguide layer in stripes, so that a stripe width of the optical absorption layer is larger than that of the optical waveguide layer; and
   performing ion implantation of protons in an oblique direction from a sidewall of the stripe.

* * * * *